United States Patent [19]

King, Sr.

[11] Patent Number: 5,094,496

[45] Date of Patent: Mar. 10, 1992

[54] PIPE PULLING DEVICES

[76] Inventor: Lloyd H. King, Sr., 2909 S. Ocean Blvd., Highland Beach, Fla. 33487

[21] Appl. No.: 509,237

[22] Filed: Apr. 16, 1990

[51] Int. Cl.⁵ .............................................. B66C 1/10
[52] U.S. Cl. .................................. 294/96; 294/86.12; 294/86.25
[58] Field of Search ................ 294/94, 93, 96, 86.12, 294/86.24, 86.25, 89, 102.1; 81/443-445; 285/258; 403/368, 369

[56] References Cited

U.S. PATENT DOCUMENTS

| | | |
|---|---|---|
| 1,414,511 | 5/1922 | Gray . |
| 1,749,380 | 3/1930 | Hinderliter ...................... 294/86.25 |
| 1,842,705 | 1/1932 | Wilkinson . |
| 1,897,561 | 2/1933 | Manucci . |
| 2,648,563 | 8/1953 | Hall . |
| 2,687,324 | 8/1954 | Grunsky et al. ...................... 294/96 |
| 2,939,739 | 6/1960 | Grunsky . |
| 3,181,396 | 5/1965 | Nance . |
| 3,208,788 | 9/1965 | Roark . |
| 3,211,476 | 10/1965 | Wagner ...................... 285/258 |
| 3,490,793 | 1/1970 | Wagner ...................... 258/285 X |
| 3,492,032 | 1/1970 | Deike ...................... 294/94 X |
| 3,751,932 | 8/1973 | Matthews, Jr. . |
| 3,854,768 | 12/1974 | King, Sr. . |
| 4,580,826 | 4/1986 | Carver et al. . |
| 4,643,472 | 2/1987 | Schukei et al. . |

Primary Examiner—Margaret A. Focarino
Assistant Examiner—Dean J. Kramer
Attorney, Agent, or Firm—Jacobson & Johnson

[57] ABSTRACT

A two phase quick setting and quick releasing pipe pulling device having an outer housing for engaging the exterior of a plastic pipe and interior radially expandable and contractible jaws that can be quickly set on the interior surface of a plastic pipe by applying a blow to the housing with the expandable jaws responsive to a pulling force on a central shaft located in the housing to further radially expand the jaws to further engage the interior of a plastic pipe as one pulls on the pipe pulling device with the expandable jaws also operable to be quickly disengaged from the interior of the plastic pipe by applying an axial blow to the central shaft of the pipe pulling device.

2 Claims, 3 Drawing Sheets

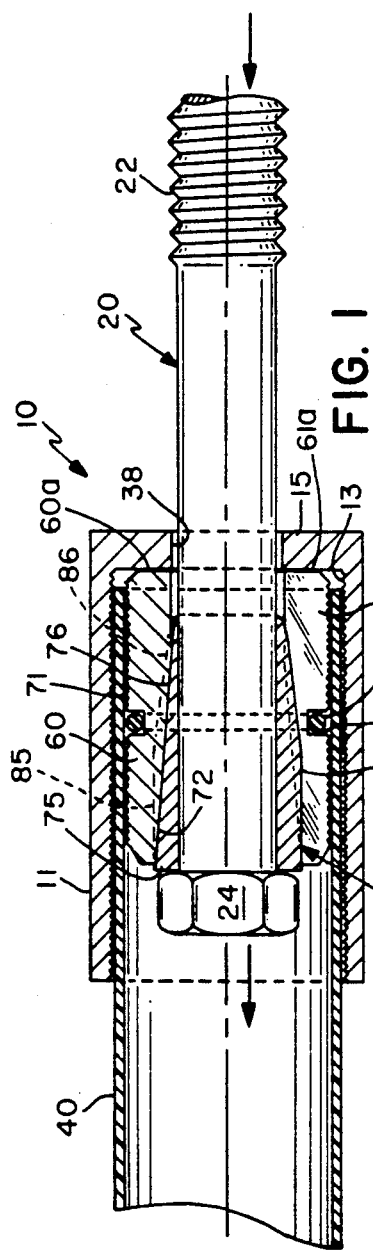
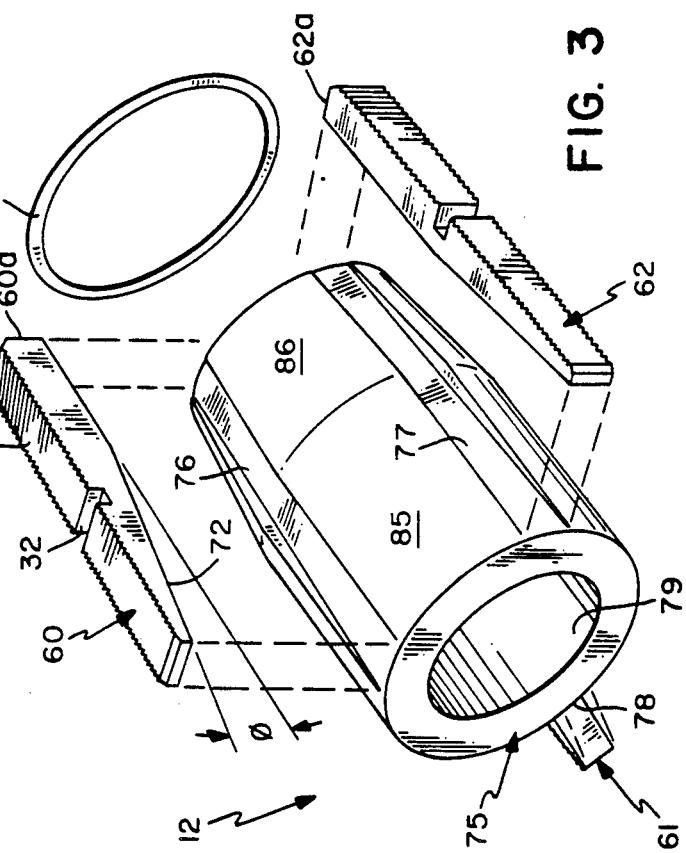
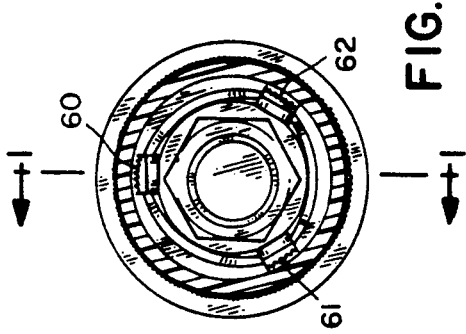

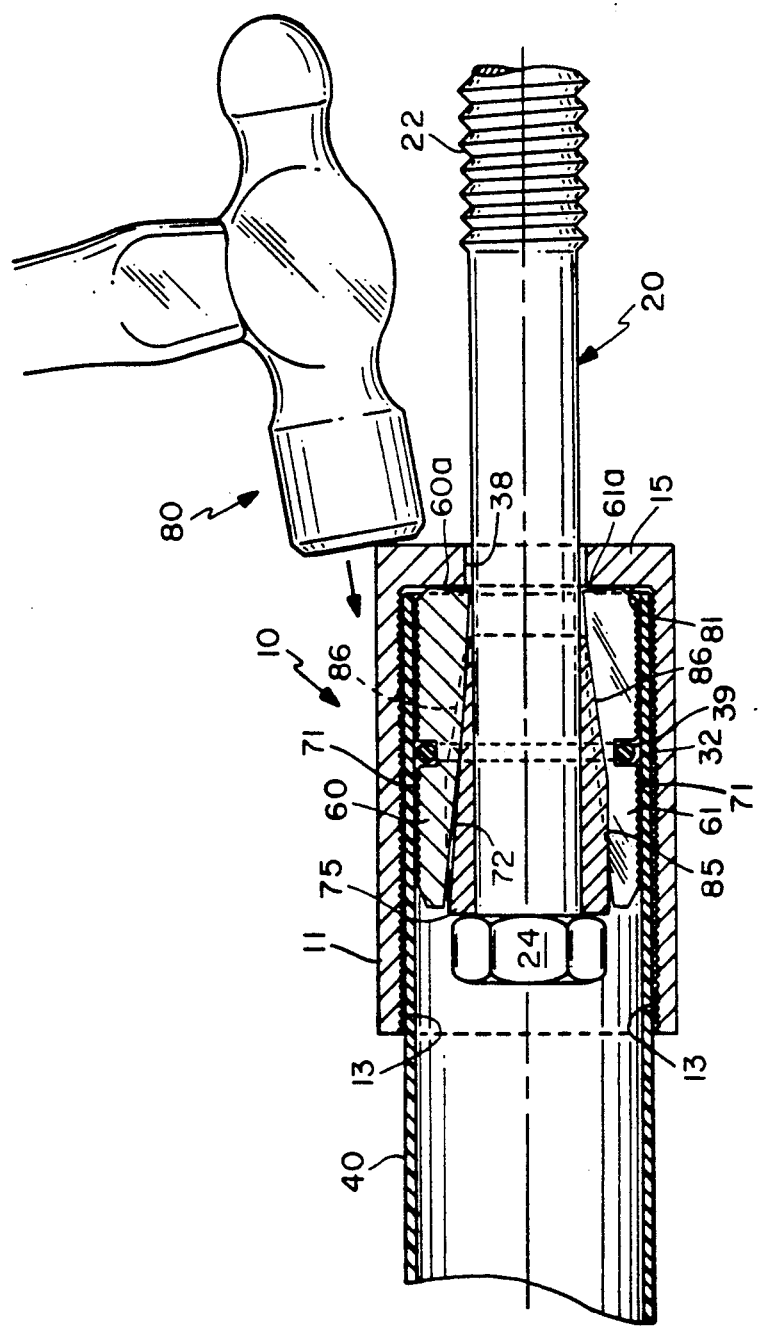
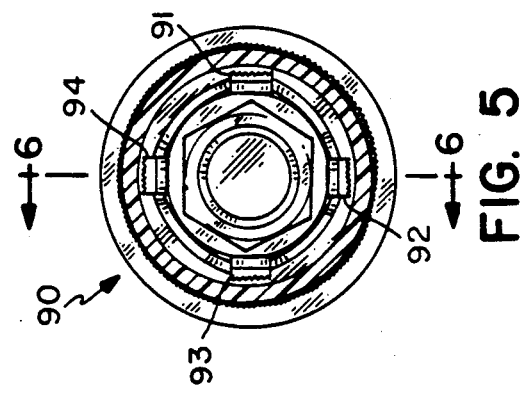

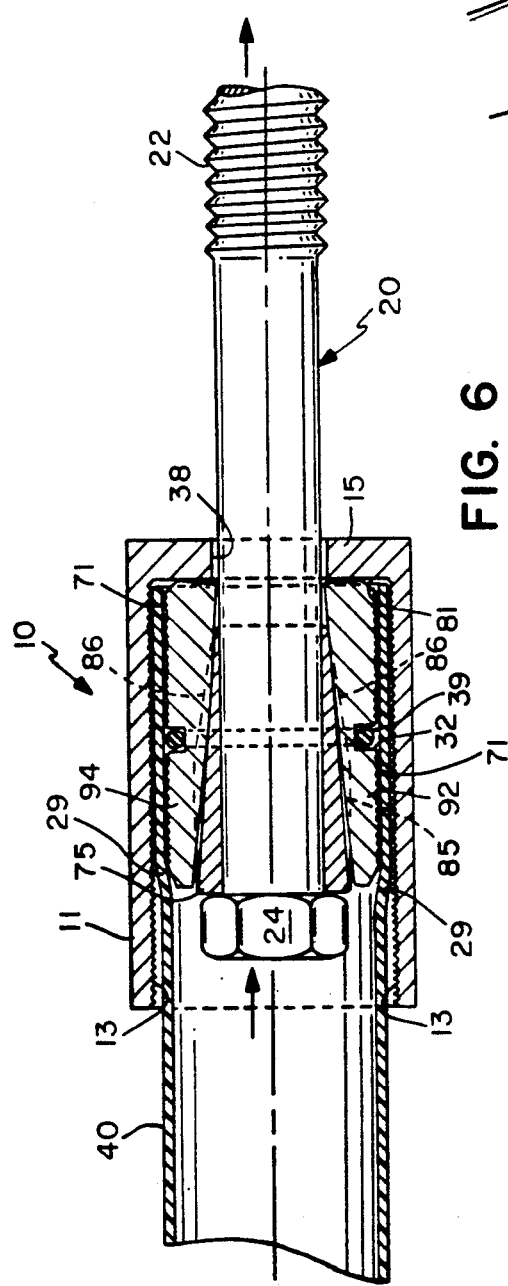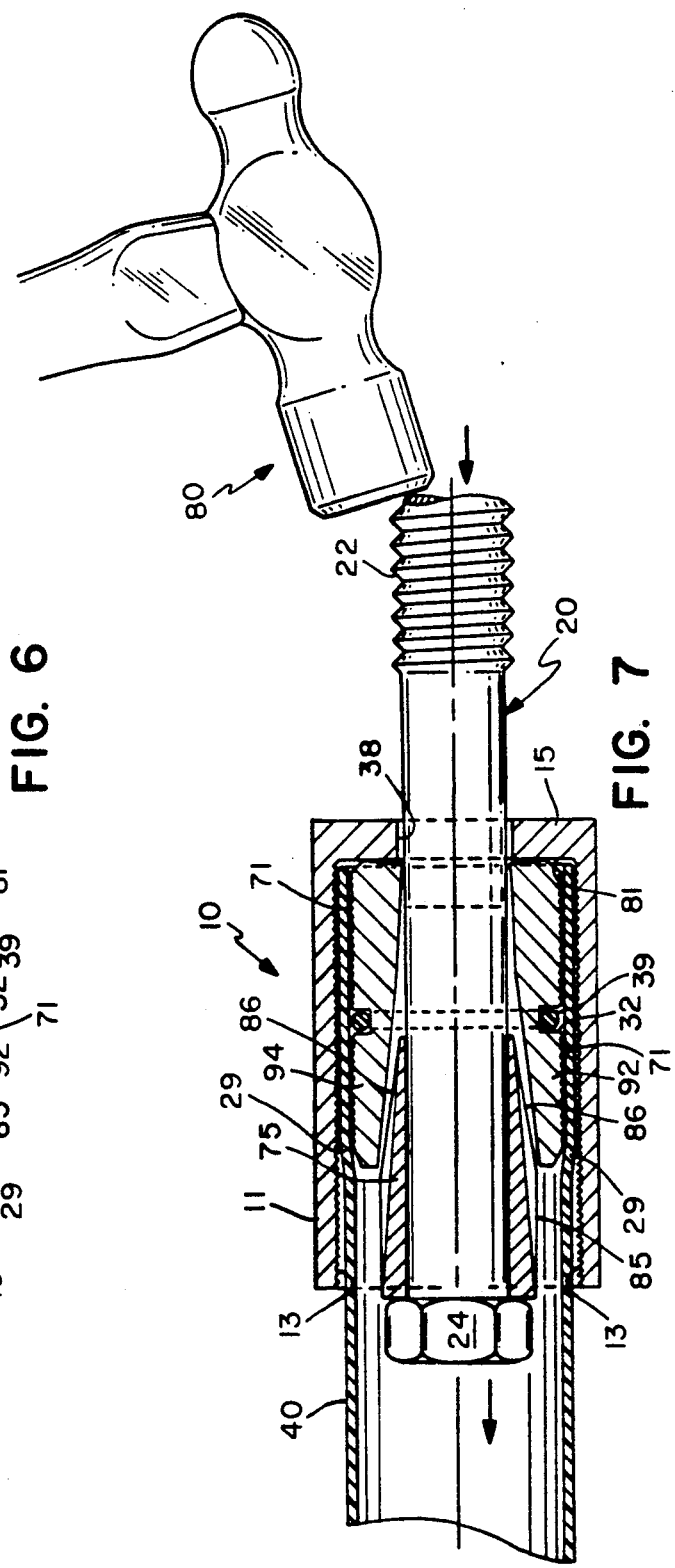

PIPE PULLING DEVICES

FIELD OF THE INVENTION

This invention relates generally to pipe pulling devices and, more specifically, to pipe pulling devices for pulling plastic pipe.

BACKGROUND OF THE INVENTION

The concept of pipe pullers for pulling underground pipe through the soil with a plow are well known in the art. Typically, a powered vehicle such as a tractor pulls a subsoil plow through the soil. Attached to the back of the plow and following in the path of the opening formed by the plow is a pipe puller that holds the end of the pipe. As the plow moves through the soil it pulls the pipe puller and the pipe into the opening formed by the plow.

One of the problems with pulling plastic pipe as opposed to pulling metal pipes is that the plastic pipe generally has an inherent resiliency that may cause the pipe puller to slip off the plastic pipe. Also the interior and exterior of plastic pipes tend to be smoother and more difficult to grasp than certain metal pipes. Another difficulty with plastic pipes is that they are usually relatively soft and may contain plasticizers that make the surface of the pipe difficult to firmly grasp. In addition some of the pipe pullers are difficult to "set" or quickly attach the pipe puller to the plastic pipe. The present invention eliminates the problem of slippage and also permits the user to quickly engage or disengage the pipe puller from the plastic pipe.

DESCRIPTION OF THE PRIOR ART

My U.S. Pat. No. 3,854,768 shows a pipe pulling device comprising an outer tapered sleeve that engages a tapered tubular holding member that engages only the outside of the plastic pipe.

The Grunsky et al. U.S. Pat. No. 2,687,324 shows a pipe puller with slidable jaws for engaging only the interior of pipe. The Grunsky device uses a set of slidable dogs that are forced into engagement of the interior of the pipe with a cylindrical skirt.

The Grunsky U.S. Pat. No. 2,939,739 shows a pipe puller that also grasps the interior of a pipe with resilient members that are forced radially outward by a conical wedge.

The Roark U.S. Pat. No. 3,208,788 shows a well tool that uses a hydraulic operated gripping means for engaging the interior of a pipe.

The Matthews U.S. Pat. No. 3,751,932 shows a pipe pulling device that grasps the interior of a pipe with dog which he refers to as slips.

The Carver et al. U.S. Pat. No. 4,580,826 shows a retrieval tool that uses teeth to engage the interior of the pipe.

The Schukei et al. U.S. Pat. No. 4,643,472 shows a gripper device that uses hard spherical balls to engage the interior of the pipe.

The Hall U.S. Pat. No. 2,648,563 shows a tube puller that has wedge members for grasping the interior of a pipe as one pulls on a ring attached to the end of the puller.

The Nance U.S. Pat. 3,181,396 shows a nipple removing tool that uses a bolt with a nut to draw a pair of semicircular segments into contact with the inside of the nipple.

The Wilkenson U.S. Pat. No. 1,842,705 shows a pipe gripper that grasps the interior of the pipe with the jaws being able to be moved away from the interior of the pipe to prevent the jaws from engaging the pipe when removing the pipe puller.

The Gray U.S. Pat. No. 1,414,511 shows a pipe puller that engages the interior of a pipe as one pulls up on the pipe puller.

The Manucci et al U.S. Pat. No. 1,897,561 shows a puller for copper tubing that has a non expandable outer housing and expandable inner jaws that are forced into contact with the interior of the pipe by tightening a nut that pulls and forces the expandable jaws outward into the interior surface of the pipe.

BRIEF DESCRIPTION OF THE DRAWINGS

FIG. 1 shows a side sectional view of the preferred embodiment of the invention;

FIG. 2 shows an end view of the pipe puller of FIG. 1;

FIG. 3 shows an exploded view of the expandable jaws of the pipe puller of FIG. 1;

FIG. 4 shows a side sectional view of the pipe puller of FIG. 1 illustrating how a user quickly engages or sets the jaws;

FIG. 5 shows an end view of an alternate embodiment of a pipe puller with four jaws;

FIG. 6 shows a side sectional view of my pipe pulling device engaging the end of a plastic pipe; and FIG. 7 is a side sectional view of the pipe puller of FIG. 6 illustrating the quick disengagement of the jaws from the plastic pipe; and

DESCRIPTION OF THE PREFERRED EMBODIMENT

Referring to the drawings, FIG. 1 shows a side sectional view of my pipe pulling device 10 frictionally gripping the inside and outside of a plastic pipe 40. Pipe pulling device 10 comprises an outer nonexpandable housing 11 and an internal expandable housing 12 with a stud bolt 20 extending therethrough. FIG. 3 shows expandable housing 12 in an exploded view with the expandable housing comprising a cylindrical housing or collar member 75 that has an inner cylindrical surface 79 that is axially slidable along the outside cylindrical surrface of stud bolt 20. Cylindrical housing 75 has an outer cylindrical surface 85 on one end and a conical shaped surface 86 located on the other end of housing 75. Surface 85 and surface 86 in cylindrical housing 75 contain three equally circumferential spaced elongated axial tapered slots 76, 77, and 78 that each axially and slidable support an elongated jaw to permit the jaw to slide axially along housing 75. The exploded view of FIG. 3 shows a first elongated jaw 60 spaced from a first axial tapered slot 76 that jaw 60 normally slides in, a second elongated jaw 61 spaced from a second axial tapered slot 78 that jaw 78 normally slides in and a third elongated jaw 62 spaced from a third axial tapered slot 77 that jaw jaw 62 normally slides in. Each of the axial tapered slot forms and angle ∅ of about five degrees. While more or less taper could be provided I have found that if the taper of each of the slots is within a range of about 4 to 7 degrees with respect to the central axis of my pipe puller I can provide not only for sliding engagement of the pipe puller but I can also quickly couple or decouple the jaws from the plastic pipe. That is, an included angle of 4 to 7 degrees permits the jaws to be quickly and easily set by tapping on the housing 11 with an object such as a hammer.

Located on the end of housing 11 is a circular end member 15 having a central circular opening 38 for sliding support and for coaxial alignment of shaft 20 with housing 11. Located on one end of shaft 20 is a threaded section 22 that permits attachment of my pipe pulling devices to an underground plow that pulls my puller and the attached plastic pipe through the soil. Located on the opposite end of shaft 20 is a nut to hold collar 75 on shaft 20.

To illustrate the gripping relationship of the jaws FIG. 1 shows elongated jaw 60 positioned for gripping operation in axial slot 76 and elongated jaw 61 for gripping opperation in axial slot 78. Since slidable jaws 60, 61, and 62 are identical only jaw 60 will be described. Likewise since axial tapered slots 76, 77, and 78 are identical only slot 76 will be described.

Jaw 60 comprises gripping means that includes a top frictional surface 71 for engaging the interior cylindrical surface of a plastic pipe that is to be pulled through the subsoil. Typically, surface 71 may be knurled or have ridges or lips for biting into the plastic pipe. In addition surface 71 may be provided with a radiused surface so that the surface substantially conforms to the surface of the interior of the plastic pipe thereby providing a larger gripping area between the plastic pipe and the expandable jaws. Located on the underside of jaw 60 is a tapered surface 72 (about five degree taper) that slidingly engages the bottom of the axial tapered slot 76 (also about five degrees) in collar 12. The degree of taper on slot 76 is complementary to the degree of taper on jaw 60 so that jaw 60 can slid axially along housing 12 with surface 71 moving radially inward or outward while remaining concentric to the exterior cylindrical surface of housing 12. That is, surface 71 remains parallel to the central axis of stud bolt 20 as the jaw 60 moves axially along member 75. The concentric or parallel movement of jaw 60 permits jaw 60 to expand outward and radially engage the interior of pipe 40 as shown in FIG. 1.

A resilient member 39 such as a rubber "O Ring" fits into a circumferential slot 32 to provide a radial inward force to hold jaw, 60, 61 and 62 in slidable contact in their respective tapered slots.

As the jaws 60, 61, and 62 are slid axially along stud 20 toward nut 24 they expand radially outward to firmly grip pipe 40 from the interior while the nonexpandable housing 11 grips the exterior surface of pipe 40. The conical surface 86 allows the "O-Ring" the expandable jaws slide along surface 86 without binding on collar 75. The combination of the nonexpandable housing and the expandable housing permits the user to firmly sandwich the end of the plastic pipe therebetween so that once the jaws are set the harder the user pulls on stud the harder the expandable housing and the nonexpandable housing grip pipe 40.

FIG. 4 illustrates how the user quickly "sets" the jaws to bring the expandable jaws and the none expandable housing into the first phase of biting frictional engagement with the end of pipe 40. To set the jaws to bite into the plastic pipe user taps on the end of nonexpandable housing 11 with a hammer 80. Note that each of the ends of the jaws 60a, 61a, and 62a projects beyond the collar 75 so that they engage annular region 81 on the inside of housing 10. During the setting phase the sudden impact on housing 10 forces the annular region 81 on the inside of housing 11 against the free projecting end 61a of expandable jaw 61 and the corresponding free projecting ends 60a and 62a of jaws 60 and 62. The force on the ends of the jaws causes the jaws to move axially toward nut 24 and radially outward with respect to member 75. Consequently, with the free ends of the jaws projecting beyond the cylindrical member 75 and cylindrical member 75 spaced from the end of housing 11 the cylindrical member 75 does not receive the direct effect of the blow on housing 11. The result is that jaws 60, 61, and 62 move axially along member 75 in response to the blow on housing 11. The axial movement causes the jaws to quickly expand radially outward and radially bite into the inside cylindrical curface of pipe 40. Once the jaws "bite" into plastic pipe 40 the second engagement phase occurs when a pulling force on stud 20 further forces the expandable jaws radially outward to force the interior end of pipe 40. A continuing pulling force on shaft 20 deforms the resilient plastic pipe outward to form a coacting frictional engagement of the outside end of pipe 40 with nonexpandable housing 11 and the inside end of pipe 40 with jaws 60, 61 and 62. The sandwiching combination of the two housings coupled with plastic pipe produce a holding force that firmly and tightly holds the plastic pipe therebetween. Generally, if the pulling force is sufficient the frictional surfaces on the jaws and the frictional nonexpandable housing penetrate the surface of the plastic pipe to form an interference fit between the frictional surfaces and the plastic pipe. When this occurs I refer to the engagement of the frictional surfaces and the plastic pipe as being in "biting engagement".

FIG. 4 illustrates the initial phase of setting the jaws. During the setting of the jaws stud 20 is normally restrained from axially motion by being connected to a pulling device. However, stud 20 need not be connected to a pulling device to set the jaws since a sudden blow from a hammer or the like on the end of housing 11 drives the free ends of jaws 60, 61, and 62 which are in contact with housing 11 drives the free ends of jaws 60, 61, and 62 which are in contact with housing 11 in one direction while the lack of contact and the inherent inertia in stud 20 and collar 75 prevents collar 75 from simultaneously moving with the jaws and housing 11. Consequently, a sudden tap on the housing 11 is sufficient to rapidly expand the jaws as they slide on the tapered surfaces in the bottom of the axial tapered slots in collar 75. The rapid radial expansion of the jaws "sets" the jaws and housing 11 in a sandwich relationship around pipe 40. After setting the jaws one applies an axial pulling force on stud 20. The axial force on stud 20 forces the jaws axially rearward and the collar 75 axially forward so that when one pulls on stud bolt 20 one increases the engagement pressure between expandable jaws 60, 61, and 61 and nonexpanadable housing 11. The increased pressure on the plastic pipe insures that when one pulls slippery plastic pipes through the subsoil the plastic pipe does not slip off my pipe puller since the higher the pulling force the greater the pulling force.

Referring to FIG. 5 there is shown an alternate embodiment of my pipe puller 90 that is substantially identical to pipe puller 10 except that pipe puller 90 uses for equally circumferentially spaced jaws 91, 92, 93, 94, and four equally spaced circumferentially tapered axial slots whereas pipe puller 10 uses only three jaws three tapered slots. While three and four jaw pullers are shown the number of jaws can be varied to suit the pulling task. For example, a pipe puller used on larger diameter plastic pipe may use more jaws while a pipe puller use on smaller diameter pipe may use fewer jaws.

FIG. 7 shows that pipe pulling device 10 includes an outer nonexpandable cylindrical housing 11 that has an interior knurled annular gripping surface 13 for grippingly engaging the expanded exterior smooth surface of plastic pipe 40. Annular gripping surface 13 has an interior diameter should be sufficiently large so that a user can freely slide the end of plastic pipe 40 into the inerior of housing 11 yet, sufficiently small so that when the plastic pipe is expanded outward to engage the gripping surface 13 it does not rupture the plastic pipe. While the clearances depends on the plastic pipe mateials in most instances a clearance of a few thousands of an inch between the interior diameter of the gripping surface 13 and the exterior diameter of the plastic pipe 40 provide sufficient clearance to insert the pipe and to provide for radial deformation without rupture of the pipe 40.

While a knurled surface has been described it should be understood that other frictional engagement surfaces could be used which provide a gripping surface for engaging the plastic pipe as the exterior of the plastic pipe is expanded radially outward against the gripping surface. Plastic pipe 40 is a conventional plastic pipe made of polymer plastics or the like. Typically, plastic pipes have sufficient inherent resiliency that they can expand radially outward a slight amount without rupturing the pipe as illustrated in FIG. 6.

In order to illustrate the effect of the sandwiching and pulling action on the end of pipe 40 reference should be made to FIG. 6. FIG. 6 shows that the end of pipe 40 expanded radially outward the outer surface of pipe 40 engages annular gripping surface 13 on the inside of nonexpandable housing 11.

In order to illustrate how my pipe puller can be quickly disengaged reference should be made to FIG. 7 which shows a hammer 80 striking the end of shaft 20. Note, the blow has axially displaced shaft 20 rearward with the jaws 92 and 94 actually spaced from the corresponding axial slots they normally side in. Once the collar and shaft 20 have been displace the resilient rubber ring 30 produces a contracting force that pulls the jaws 91, 92, 93, and 94 radially inward toward shaft 20 thereby allowing the end of pipe to be disengaged from both the inner jaws and the interior surface 13 in housing 11. Consequently, the present invention provides for both quick setting and quick release with the end of a resilient pipe.

Outer cylindrical housing 11 and expandable jaws 60, 61, and 62 are generally made of a material that is harder than the pipe to be pulled so that the jaws can bite into the pipe surface to provide a better grip. Typically, the nonexpandable housing and expandable jaws may be made of a metal or the like.

I claim:

1. The method of pulling a pipe comprising the steps of:

placing a non expandable housing having a surface for engaging a free end of an expandable jaw around the end of a plastic pipe;

placing a tapered shaft having a central axis with an expandable jaw having a free end in the nonexpandable housing with the free end of the jaw in contact with the surface for engaging the free end of an expandable jaw;

striking on the nonexpandable housing to set the expandable jaw;

pulling axially on the tapered shaft to radially expand the expandable jaw until the end of the plastic pipe is radially deformed and sandwiched between the expandable jaw and the nonexpandable housing; and continuing to pull axially on the tapered shaft to pull the nonexpandable housing, the expandable jaw, the tapered shaft and the pipe as a unit.

2. The method of claim 1 including the step of quickly releasing the expandable jaw from the pipe by applying a sudden blow to the pulling shaft in a direction opposite to the direction the shaft is pulled.

* * * * *